United States Patent
Bassov et al.

(10) Patent No.: US 10,852,975 B2
(45) Date of Patent: Dec. 1, 2020

(54) EFFICIENT DATA DEDUPLICATION CACHING

(71) Applicant: EMC IP Holding Company LLC, Hopkinton, MA (US)

(72) Inventors: Ivan Bassov, Brookline, MA (US); Istvan Gonczi, Berkley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 90 days.

(21) Appl. No.: 16/256,375

(22) Filed: Jan. 24, 2019

(65) Prior Publication Data

US 2020/0241778 A1 Jul. 30, 2020

(51) Int. Cl.
*G06F 3/06* (2006.01)
*G06F 12/0862* (2016.01)

(52) U.S. Cl.
CPC .......... *G06F 3/0641* (2013.01); *G06F 3/0608* (2013.01); *G06F 3/0679* (2013.01); *G06F 12/0862* (2013.01)

(58) Field of Classification Search
CPC .... G06F 3/0641; G06F 3/0608; G06F 3/0679; G06F 12/0862
See application file for complete search history.

(56) References Cited

U.S. PATENT DOCUMENTS

| 2011/0246741 | A1* | 10/2011 | Raymond | G06F 16/137 711/170 |
| 2014/0101113 | A1* | 4/2014 | Zhang | G06F 11/1453 707/692 |
| 2018/0150260 | A1* | 5/2018 | Tsirkin | G06F 12/1009 |
| 2018/0267896 | A1* | 9/2018 | Zhang | G06F 3/0641 |
| 2019/0129970 | A1* | 5/2019 | Armangau | G06F 16/1748 |

* cited by examiner

*Primary Examiner* — Ryan Bertram
*Assistant Examiner* — Edmund H Kwong
(74) *Attorney, Agent, or Firm* — Muirhead and Saturnelli, LLC

(57) ABSTRACT

Techniques for data processing may include: receiving a data chunk and an associated digest; and performing data deduplication processing for the data chunk comprising: determining whether there is an existing entry in a deduplication digest cache for the digest; and responsive to determining there is no existing entry in the deduplication digest cache, performing processing including: determining whether there is an existing entry in a mapping structure for the digest, the mapping structure mapping digests to associated pages of related entries in a deduplication data store; and responsive to determining there is an existing entry in the mapping structure, performing second processing including: obtaining, from the existing entry, a page mapped to the digest; and loading the page of entries from the deduplication data store into the deduplication digest cache. At least some entries of the page may be prefetched and loaded into the deduplication digest cache prior to use.

20 Claims, 5 Drawing Sheets

EFFICIENT DATA DEDUPLICATION CACHING

BACKGROUND

Technical Field

This application generally relates to data storage and, more particularly, caching techniques.

Description of Related Art

Systems may include different resources used by one or more host processors. Resources and host processors in the system may be interconnected by one or more communication connections, such as network connections. These resources may include, for example, data storage devices such as those included in the data storage systems manufactured by Dell Inc. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may issue I/O operations, such as data read and write operations, received at a data storage system. Host systems may store and retrieve data by issuing the I/O operations to the data storage system containing a plurality of host interface units, disk drives (or more generally storage devices), and disk interface units. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of files, objects, logical units, logical devices or logical volumes. Thus, the I/O operations issued by the host may be directed to a particular storage entity, such as a file or logical device. The logical devices may or may not correspond to the actual physical drives. Allowing multiple host systems to access the single data storage system allows the host systems to share data stored therein.

SUMMARY OF THE INVENTION

In accordance with one aspect of the techniques herein is a method of processing data comprising: receiving a data chunk and a digest generated in accordance with the data chunk; and performing data deduplication processing for the data chunk comprising: determining whether there is an existing entry in a deduplication digest cache for the digest; and responsive to determining there is no existing entry in the deduplication digest cache for the digest, performing first processing including: determining whether there is an existing entry in a mapping structure for the digest, wherein the mapping structure maps digests to associated pages of related entries in a deduplication data store; and responsive to determining there is an existing entry in the mapping structure for the digest, performing second processing including: obtaining, from the existing entry of the mapping structure, a page mapped to the digest; and loading the page of entries from the deduplication data store into the deduplication digest cache. If there is an existing entry in the mapping structure for the digest, it may be determined that the data chunk is a duplicate of an existing data chunk stored in the deduplication data store. If there is an existing entry in the deduplication digest cache for the digest, it may be determined that the data chunk is a duplicate of an existing data chunk stored in the deduplication data store. Responsive to determining there is existing entry in the mapping structure for the digest, third processing may be performed that includes adding a new entry for the data chunk to a current page in cache being populated. The method may include determining whether the current page is complete whereby no additional entries are to be added to the current page. Responsive to determining the current page is complete, fourth processing may be performed that includes updating the deduplication data store and the mapping structure in accordance with a plurality of entries of the current page. The fourth processing may include adding new entries to the deduplication data store and the mapping structure corresponding to the plurality of entries in the current page, wherein the new entries added to the deduplication data store are logically contiguous in the deduplication data store. The current page may be determined as complete when the current page is full and includes a specified number of entries. The mapping structure and deduplication digest cache may be stored in a memory, and the deduplication data store may be stored on non-volatile storage ranked as having a lower performance relative to the memory. The deduplication digest cache includes entries identifying a portion of corresponding entries in the deduplication data store. Each entry of the deduplication digest cache and its corresponding entry in the deduplication data store may identify a different digest and a location where a particular data chunk, having the different digest of said each entry, is stored. The deduplication data store may comprise a plurality of pages, and each of the plurality of pages may include a plurality of entries determined as related in accordance with one or more specified criteria. The one or more specified criteria may include temporal locality wherein entries of a same page are all written in connection with write I/O operations received within a same time period. The one or more specified criteria may include spatial locality wherein entries of a same page identify data chunks that are stored in proximity to one another on physical storage. The one or more specified criteria may include spatial locality wherein entries of a same page identify data chunks that are stored in logical proximity to one another in a logical address space.

In accordance with another aspect of techniques herein is a system comprising: one or more processors; and a memory comprising code stored thereon that, when executed, performs a method of processing data comprising: receiving a first data chunk and a first digest generated in accordance with the first data chunk; and performing data deduplication processing for the first data chunk comprising: determining whether there is an existing entry in a deduplication digest cache for the first digest; and responsive to determining there is no existing entry in the deduplication digest cache for the first digest, performing first processing including: determining whether there is an existing entry in a mapping structure for the first digest, wherein the mapping structure maps digests to associated pages of related entries in a deduplication data store; and responsive to determining there is an existing entry in the mapping structure for the first digest, performing second processing including: obtaining, from the existing entry of the mapping structure, a first page mapped to the first digest; and loading the first page of entries from the deduplication data store into the deduplication digest cache.

In accordance with another aspect of techniques herein is a computer readable medium comprising code stored thereon that, when executed, performs a method of processing data comprising: receiving a first data chunk and a first digest generated in accordance with the first data chunk; and performing data deduplication processing for the first data chunk comprising: determining whether there is an existing entry in a deduplication digest cache for the first digest; and responsive to determining there is no existing entry in the deduplication digest cache for the first digest, performing first processing including: determining whether there is an existing entry in a mapping structure for the first digest, wherein the mapping structure maps digests to associated pages of related entries in a deduplication data store; and responsive to determining there is an existing entry in the mapping structure for the first digest, performing second processing including: obtaining, from the existing entry of the mapping structure, a first page mapped to the first digest; and loading the first page of entries from the deduplication data store into the deduplication digest cache. If there is an existing entry in the mapping structure for the digest, it may be determined that the data chunk is a duplicate of an existing data chunk stored in the deduplication data store. If there is an existing entry in the deduplication digest cache for the digest, it may be determined that the data chunk is a duplicate of an existing data chunk stored in the deduplication data store. Responsive to determining there is existing entry in the mapping structure for the digest, third processing may be performed that includes adding a new entry for the data chunk to a current page in cache being populated. The method may include determining whether the current page is complete whereby no additional entries are to be added to the current page. Responsive to determining the current page is complete, fourth processing may be performed that includes updating the deduplication data store and the mapping structure in accordance with a plurality of entries of the current page; and adding new entries to the deduplication data store and the mapping structure corresponding to the plurality of entries in the current page, wherein the new entries added to the deduplication data store are logically contiguous in the deduplication data store.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
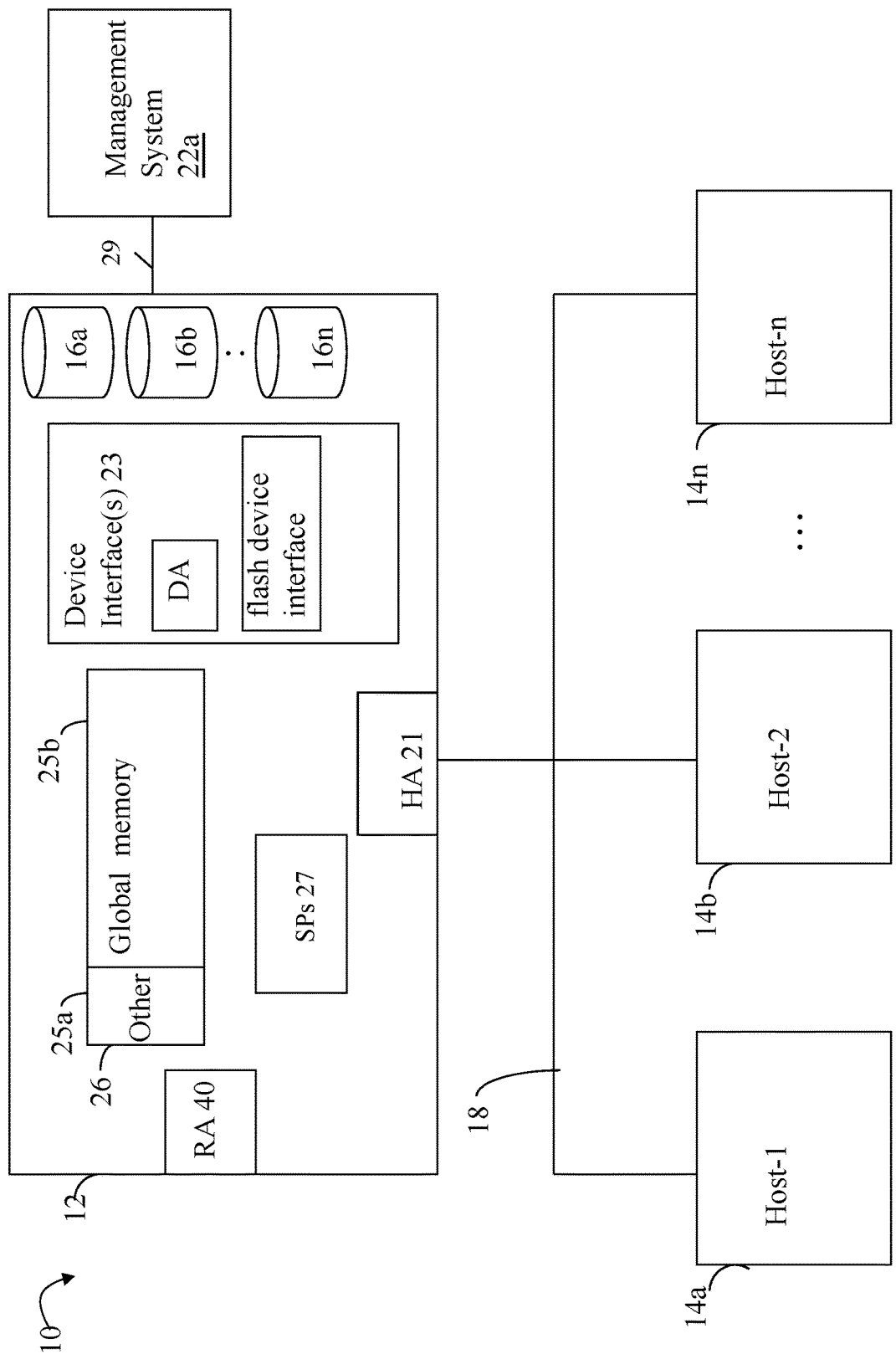
FIGS. 1 and 2B are examples of components that may be included in a system in accordance with techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as block-based protocols (e.g., SCSI, Fibre Channel, iSCSI), file system-based protocols (e.g., NFS), and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN (storage area network) or LAN (local area network), in an embodiment using the techniques herein. It should also be noted that an embodiment may include data storage arrays or other components from one or more vendors. In subsequent examples illustrated the techniques herein, reference may be made to a single data storage array by a vendor. However, as will be appreciated by those skilled in the art, the techniques herein are applicable for use with other data storage arrays by other vendors and with other components than as described herein for purposes of example.

The data storage system 12 may be a data storage appliance or a data storage array including a plurality of data storage devices (PDs) 16a-16n. The data storage devices 16a-16n may include one or more types of data storage devices such as, for example, one or more rotating disk drives and/or one or more solid state drives (SSDs). An SSD is a data storage device that uses solid-state memory to store persistent data. SSD may refer to solid state electronics devices as distinguished from electromechanical devices, such as hard drives, having moving parts. Flash devices or flash memory-based SSDs are one type of SSD that contains no moving mechanical parts. The flash devices may be constructed using nonvolatile semiconductor NAND flash memory. The flash devices may include, for example, one or more SLC (single level cell) devices and/or MLC (multi level cell) devices.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a system cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices, logical volumes (LVs) which may also referred to herein as logical units (e.g., LUNs). A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Also shown in FIG. 1 is a management system 22a that may be used to manage and monitor the system 12. In one embodiment, the management system 22a may be a computer system which includes data storage system management software or application such as may execute in a web browser. A data storage system manager may, for example, view information about a current data storage configuration such as LUNs, storage pools, and the like, on a user interface (UI) in a display device of the management system 22a. Alternatively, and more generally, the management software may execute on any suitable processor in any suitable system. For example, the data storage system management software may execute on a processor of the data storage system 12.

It should be noted that each of the different adapters, such as HA 21, DA or disk interface, RA, and the like, may be implemented as a hardware component including, for example, one or more processors, one or more forms of memory, and the like. Code may be stored in one or more of the memories of the component for performing processing.

The device interface, such as a DA, performs I/O operations on a physical device or drive 16a-16n. In the following description, data residing on a LUN may be accessed by the device interface following a data request in connection with I/O operations. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical storage device (PD) and location on the PD. The DA which services the particular PD may further perform processing to either read data from, or write data to, the corresponding physical device location for the I/O operation.

It should be noted that an embodiment of a data storage system may include components having different names from that described herein but which perform functions similar to components as described herein. Additionally, components within a single data storage system, and also between data storage systems, may communicate using any suitable technique that may differ from that as described herein for exemplary purposes. For example, element 12 of FIG. 1 may be a data storage system, such as a data storage array, that includes multiple storage processors (SPs). Each of the SPs 27 may be a CPU including one or more "cores" or processors and each may have their own memory used for communication between the different front end and back end components rather than utilize a global memory accessible to all storage processors. In such embodiments, memory 26 may represent memory of each such storage processor.

Generally, techniques herein may be used in connection with any suitable storage system, appliance, device, and the like, in which data is stored. For example, an embodiment may implement techniques herein using a midrange data storage system, such as a Dell EMC Unity® data storage system, as well as a high end or enterprise data storage system, such as a Dell EMC™ PowerMAX™ data storage system.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to FIG. 1, the control commands may be issued from data storage management software executing on management system 22a to the data storage system 12. Such commands may be, for example, to establish or modify data services, provision storage, perform user account management, and the like. For example, commands may be issued over the control path to provision storage for LUNs, create a snapshot, define conditions of when to create another snapshot, define or establish local and/or remote replication services, define or modify a schedule for snapshot or other data replication services, define a RAID group, obtain data storage management and configuration information for display in a graphical user interface (GUI) of a data storage management program or application, generally modify one or more aspects of a data storage system configuration, list properties and status information regarding LUNs or other storage objects (e.g., physical and/or logical entities in the data storage system), and the like.

The data path and control path define two sets of different logical flow paths. In at least some of the data storage system configurations, at least part of the hardware and network connections used for each of the data path and control path may differ. For example, although both control path and data path may generally use a network for communications, some of the hardware and software used may differ. For example, with reference to FIG. 1, a data storage system may have a separate physical connection 29 from a management system 22a to the data storage system 12 being managed whereby control commands may be issued over such a physical connection 29. However, it may be that user I/O commands are never issued over such a physical connection 29 provided solely for purposes of connecting the management system to the data storage system. In any case, the data path and control path each define two separate logical flow paths.

An embodiment of a data storage system in accordance with techniques herein may perform different data processing operations or services on stored user data. For example, the data storage system may perform one or more data reduction operations, such as data deduplication and compression, as well as other types of operations or services. Such data reduction operations attempt to reduce the amount of storage needed for storing data on non-volatile backend storage devices (e.g., PDs) with the goal of reducing the cost per unit of storage consumed (e.g., dollar cost per GB of storage). Generally, data deduplication and compression techniques are known in the art and any suitable such technique may be used in an embodiment in accordance with techniques herein. In at least one embodiment, the compression technique may be a lossless compression technique such as an algorithm from the Lempel Ziv algorithm family (e.g., LZ77, LZ78, LZW, LZR, and the like). In at least one embodiment in accordance with techniques herein, data deduplication processing performed may include digest or hash value computation using an algorithm such as based on the SHA-256 hashing algorithm known in the art. Data deduplication generally refers to removing redundant or duplicate data portions. Data deduplication techniques may include looking for duplicate data chunks whereby only a single instance of the data chunk is retained (stored on physical storage) and where pointers or references may be used in connection with duplicate or redundant copies (which reference or identify the single stored instance of the data chunk).

Figure 2A:
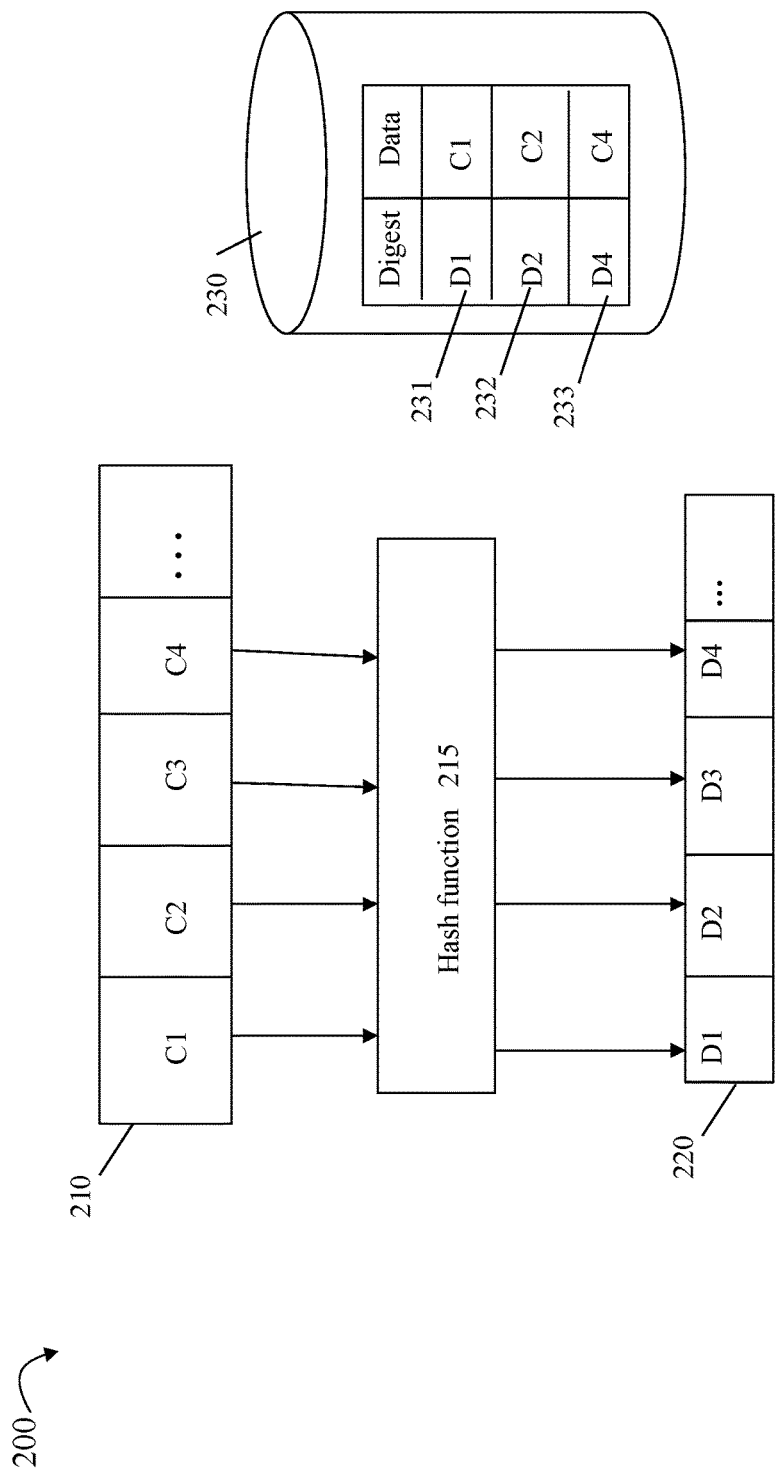
FIG. 2A is an example illustrating data deduplication as may be performed in an embodiment in accordance with techniques herein.

Referring to FIG. 2A, shown is an example 200 illustrating processing that may be performed in connection with data deduplication processing in an embodiment in accordance with techniques herein. Element 210 may denote the original data being written or stored on back-end non-volatile storage. The original data may be partitioned into multiple data chunks C1, C2, C3, C4 and the like. In at least one embodiment and for purposes of illustration, the data chunks may all be the same size where the size may vary with embodiment. As a variation depending on the data deduplication technique utilized, the chunks of 210 may be of varying or different sizes. Each chunk is provided as an input to hash function 215. As noted above, in at least one embodiment, the hash function 215 may be the SHA-256 hashing algorithm, or more generally, any suitable cryptographic hashing function known in the art. For each chunk of 210, the hash function 215 may perform processing and generate, as an output, a hash value or digest. Element 220 includes digests D1, D2, D3, D4, and the like, where a corresponding different one of the digests DN is generated for one of the chunks CN (where "N" is an integer denoting the chunk and associated digest generated for that chunk). For example, D1 is the digest generated for C1, D2 is the digest generated for C2, D3 is the digest generated for C3, and so on. Generally, a hash function 215 is selected which has an acceptably low probability of a "hash collision" of generating the same digest or hash value for two different chunks. The strength of the hash function 215 may be measured by the unlikelihood of a collision occurring two different input chunks of data produce the same digest. The strength increases with the bit length of the hash value or digest. Thus, if two chunks, such as C1 and C3, have the same digests whereby D1=D3, then chunks C1 and C3 match (e.g., are identical matching data chunks). If two chunks, such as C1 and C4, have different digests whereby D1 does not equal D4, then chunks C1 and C4 do not match (e.g., are different or non-matching data chunks). In cases where two matching or identical chunks have the same digest, only a single copy of the data chunk is stored on backend non-volatile physical storage of the data storage system. The single stored instance of the data chunk may be referenced using a pointer, handle, the digest of the chunk, and the like.

Element 230 of FIG. 2A may denote the data store used to store data chunks. In this example, as noted above, assume chunks C1 and C3 are the same with remaining chunks C2 and C4 being unique. In at least one embodiment, element 230 may be organized and managed using a data structure, such as a hash table. In at least one embodiment, computed digests may be used as an index into the hash table where the single unique instances of data chunks may be stored (along with other metadata as may be needed for maintaining the table and also in accordance with the particular hash table management used in an embodiment). Hash tables are data structures known in the art. A hash table uses a hash function to compute an index into an array of buckets or slots, from which the desired data can be found. In this example, the chunk of data may be mapped by hash function 215, and thus by the chunk's digest, to a particular entry in the table at which the chunk data is stored. To further illustrate, the hash function 215 may be used to generate a digest for a particular data chunk. The digest is then further mapped (e.g., such as by another mathematical function, using particular portions of the digest, and the like) to a particular index or entry of the hash table. The particular mapping used to map the digest to a corresponding table entry varies, for example, with the digest and the size of hash table.

When storing a new data chunk, such as C1, its digest may be mapped to a particular hash table entry 231 whereby if the table entry is null/empty, or otherwise does not already include a data chunk matching C1, then C1 is stored in the table entry along with its associated digest D1 (this is the first time chunk C1 is recorded in the data store 230). Otherwise, if there is already an existing entry in the table including a data chunk matching C1, it indicates that the new data chunk is a duplicate of an existing chunk. In this example as noted above, processing is performed for C1, C2, and C4 respectively, where entries 231, 232, and 233 are added since there are no existing matching entries in the hash table. When processing chunk C3, as noted above, C3 has a digest D3 matching D1 whereby C3 (and thus D3) maps to entry 231 of the hash table already including a matching chunk C1 (so no additional data chunk is added to 230 for C3 since C3 is determined as a duplicate of C1). In connection with representing a particular file or other storage entity including multiple duplicate occurrences of a particular chunk such as C3, the single instance or copy of the data may be stored in 230. Additionally, a handle or reference, such as identifying the hash table entry 231, its digest, and the like, may be used to reference the single instance or copy of the data storage in 230. When reconstructing or restoring data such as the file to its original form, the handle or reference into the hash table for chunk C3 may be used to obtain the actual C3 chunk of data from 230.

Figure 2B:
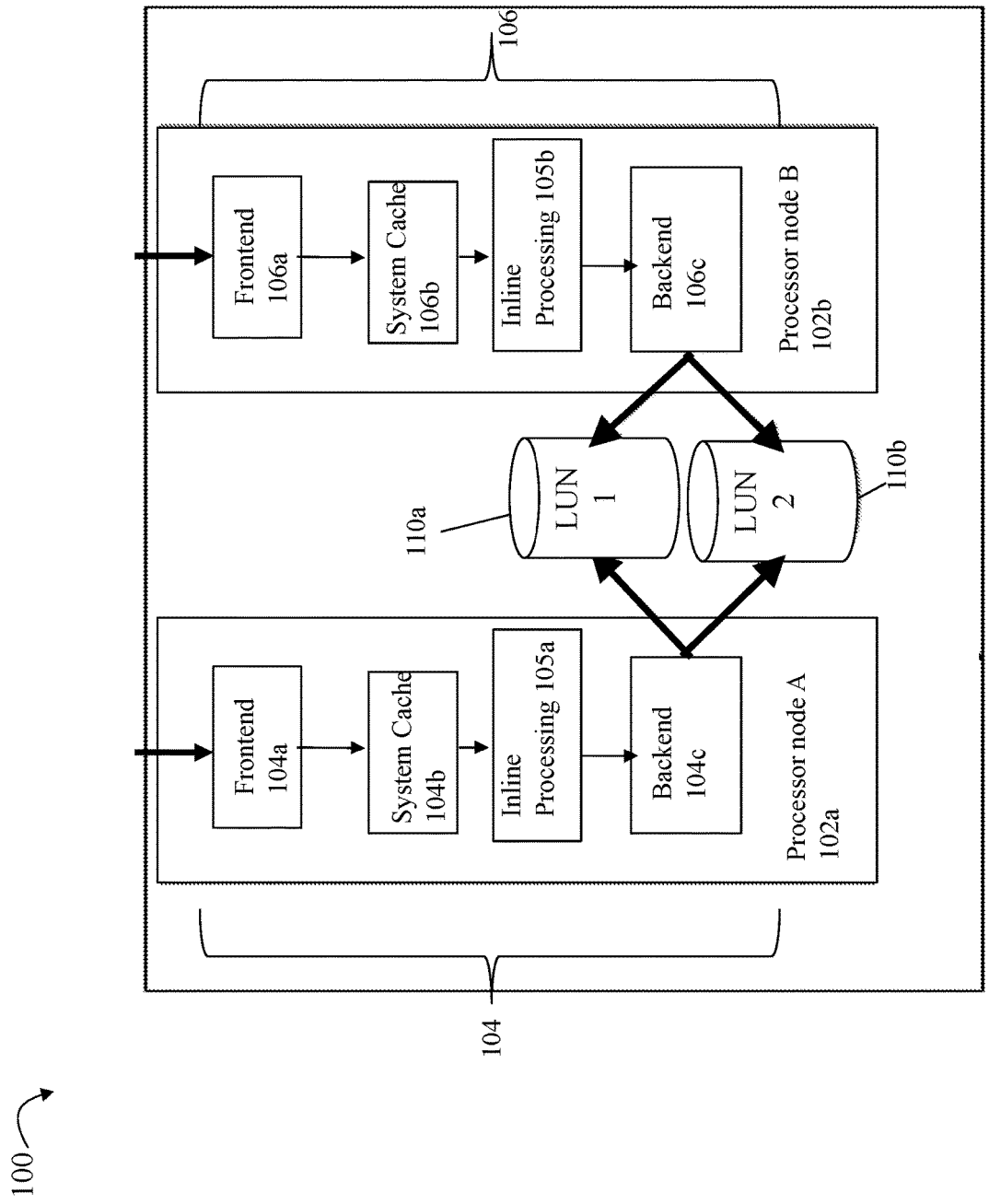

With reference to FIG. 2B, shown is an example 100 illustrating components that may be included in the data path in at least one existing data storage system in accordance with techniques herein. The example 100 includes two processor nodes A 102a and B 102b and associated software stacks 104, 106 of the data path where I/O requests may be received by either processor node 102a or 102b. In the example 200, the data path 104 of processor node A 102a includes: the frontend (FE) component 104a (e.g., an FA or front end adapter) that translates the protocol-specific request into a storage system-specific request; a system cache layer 104b where data is temporarily stored; an inline processing layer 105a; and a backend (BE) component 104c that facilitates movement of the data between the system cache and permanent non-volatile storage (e.g., back end physical non-volatile storage devices accessed by BE components such as DAs as described herein). During movement of data in and out of the system cache layer 104b (e.g., such as in connection with read and writing data respectively, to physical storage 110a, 110b, inline processing may be performed by layer 105a. Such inline processing operations of 105a may be optionally performed and may include any one of more data processing operations in connection with data that is flushed from system cache layer 104b to back-end non-volatile physical storage 110a, 110b, as well as when retrieving data from back-end non-volatile physical storage 110a, 110b to be stored in system cache layer 104b. In at least one embodiment, the inline processing may include performing compression and data duplication. Although in following paragraphs reference may be made to inline processing including compression and data deduplication, more generally, the inline processing may include performing any suitable or desirable data processing operations as part of the I/O or data path (e.g., where such operations may include any of compression and data deduplication, as well as any other suitable data processing operation).

In a manner similar to that as described for data path 104, the data path 106 for processor node B 102b has its own FE component 106a, system cache layer 106b, inline processing layer 105b, and BE component 106c that are respectively similar to components 104a, 104b, 105a and 104c. Elements 110a, 110b denote physical storage provisioned for LUNs whereby an I/O may be directed to a location or logical address to read data from, or write data to, the logical address. The LUNs 110a, 110b are examples of storage objects representing logical storage entities included in an existing data storage system configuration. Since, in this example, writes directed to LUNs 110a, 110b may be received for processing by either of the nodes 102a and 102b, the example 100 illustrates what may also be referred to as an active-active configuration.

In connection with a write operation as may be received from a host and processed by processor node A 102a, the write data may be written to the system cache 104b, marked as write pending (WP) denoting it needs to be written to physical storage 110a, 110b and, at a later point in time, the write data may be destaged or flushed from the system cache to the physical storage 110a, 110b by the BE component 104c. The write request may be considered complete once the write data has been stored in the system cache whereby an acknowledgement regarding the completion may be returned the host (e.g., by component 104a). At various points in time, WP data stored in the system cache is flushed or written out to physical storage 110a, 110b. In connection with inline processing layer 105a, prior to storing the original data on physical storage 110a, 110b, compression and data deduplication processing may be performed that converts the original data (as stored in the system cache prior to inline processing) to a resulting form (that may include compressed and/or deduplicated portions) which is then written to physical storage 110a, 110b. In at least one embodiment, when deduplication processing determines that a portion (such as a chunk) of the original data is a duplicate of an existing data portion already stored on 110a, 110b, that particular portion of the original data is not stored in a compressed form and may rather be stored in its deduplicated form (e.g., there is no need for compression of a chunk determined to be duplicate of another existing chunk). If the original data portion is not a duplicate of an existing portion already stored on 110a, 110b, the original data portion may be compressed and stored in its compressed form on 110a, 110b.

In connection with a read operation to read a chunk of data, a determination is made as to whether the requested read data chunk is stored in its original form (in system cache 104b or on physical storage 110a, 110b), or whether the requested read data chunk was previously deduplicated or compressed. If the requested read data chunk (which is stored in its original decompressed, non-deduplicated form) is in system cache, the read data chunk is retrieved from the system cache 104b and returned to the host. Otherwise, if the requested read data chunk is not in system cache 104b but is stored on physical storage 110a, 110b in its original form, the requested data chunk is read by the BE component 104c from the backend storage 110a, 110b, stored in the system cache and then returned to the host.

If the requested read data chunk was previously deduplicated, the read data chunk is recreated and stored in the system cache in its original form so that it can be returned to the host. If the requested read data chunk was previously compressed, the chunk is first decompressed prior to sending the read data chunk to the host. If the compressed read data chunk is already stored in the system cache, the data is uncompressed to a temporary or buffer location, the uncompressed data is sent to the host, and the buffer or temporary location is released. If the compressed read data chunk is not in system cache but stored on physical storage 110a, 110b, the compressed read data chunk may be read from physical storage 110a, 110b into system cache, uncompressed to a buffer or temporary location, and then returned to the host. Thus, requested read data stored on physical storage 110a, 110b may be stored in a deduplicated or compressed form as noted above where processing is performed by 105a to restore or convert the deduplicated or compressed form of the data to its original data form prior to returning the requested read data to the host.

In connection with techniques herein, each processor or CPU may include its own private dedicated CPU cache (also sometimes referred to as processor cache) that is not shared with other processors. In at least one embodiment, the CPU cache, as in general with cache memory, may be a form of fast memory (relatively faster than main memory which may be a form of RAM). In at least one embodiment, the CPU or processor cache is on the same die or chip as the processor and typically, like cache memory in general, is far more expensive to produce than normal RAM such as may be used as main memory. Processor cache is substantially faster than the system RAM such as used as main memory and contains information that the processor will be immediately and repeatedly accessing. The faster memory of the CPU cache may, for example, run at a refresh rate that's closer to the CPU's clock speed, which minimizes wasted cycles. In at least one embodiment, there may be two or more levels (e.g., L1, L2 and L3) of cache. The CPU or processor cache may include at least an L1 level cache that is the local or private CPU cache dedicated for use only by that particular processor. The two or more levels of cache in a system may also include at least one other level of cache (LLC or lower level cache) that is shared among the different CPUs. The L1 level cache serving as the dedicated CPU cache of a processor may be the closest of all cache levels (e.g., L1-L3) to the processor which stores copies of the data from frequently used main memory locations. Thus, the system cache as described herein may include the CPU cache (e.g., the L1 level cache or dedicated private CPU/processor cache) as well as other cache levels (e.g., the LLC) as described herein. Portions of the LLC may be used, for example, to initially cache write data which is then flushed to the backend physical storage.

When the processor performs processing, such as in connection with inline processing 105a, 105b as noted above, data may be loaded from main memory and/or other lower cache levels into its CPU cache. In particular, inline compression (ILC) and inline data deduplication (ILD) may be performed as part of inline processing 105a, 105b. In at least one embodiment, the size of a data chunk processed by ILC and ILD may be 256 bytes.

Some existing implementations of deduplication use a deduplication data store as described in connection with element 230 of FIG. 2A having a hash table organized by indices which are randomly distributed so that updates, retrievals, and other data access operations can be costly. The data store may be stored on backend non-volatile storage PDs which can be costly (in terms of time) to access when performing data deduplication processing. To improve performance, some existing implementations may use caching to cache portions of the data store. However, the entire data store is typically not capable of being stored completely in cache due to the often large size of the data store as compared to the limited size of the cache. Additionally, any cached portion of the data store may not be persistently stored where the cache thus requires repopulation upon reboot of the system.

Described herein are techniques that provide a different, more efficient organization of the deduplication data store. In at least one embodiment, the deduplication data store may be stored on PDs having a generally slower performance in terms of access time relative to performance and access time of memory, such as cache. The deduplication data store may be organized in pages of related entries. Entries of the same page may be characterized and determined as related in accordance with one or more criteria. For example, such criteria may include spatial locality and/or temporal locality. Thus, rather than have entries of the deduplication data store be grouped by some portion of the digest, which is a randomizer (e.g., such as noted above in connection with some existing systems not in accordance with techniques herein), an embodiment in accordance with techniques herein may group related entries in the same page of logically contiguous entries in the deduplication data store. Neighboring or logically adjacent entries of the deduplication data store may be related, and thus, likely to be accessed within the same small time period. In this manner, in at least one embodiment, when accessing one entry of the page, the remaining entries of the page may be prefetched and stored in cache (e.g., in the deduplication digest cache described elsewhere herein) prior to a request for one or more of the remaining entries. Thus, efficiently prefetching the remaining entries of the page when a single one of the entries of the page is requested provided for storing additional entries in cache that are expected to be referenced relatively soon.

In at least one embodiment in accordance with techniques herein, multiple cached structures may be used. The cached structures may include a digest to page mapping structure (also referred to herein mapping structure), the deduplication digest cache, and a current page. The mapping structure may include mapping information regarding current entries of the deduplication data store. For each entry identifying a data chunk currently stored in the deduplication data store, the mapping structure may include a corresponding mapping entry that maps a digest of the data chunk to a corresponding page in the data store that includes the entry. In this manner, for a given data chunk having a corresponding digest, the mapping structure may be used to determine whether there is an existing entry already in the deduplication data store for the given data chunk thereby denoting the given data chunk is a duplicate (of one already in the data store). In at least one embodiment, the deduplication digest cache may include a portion, or generally less than all, of the entries of the deduplication data store where entries of the same page of the deduplication data store may be selectively loaded into the deduplication digest cache when a single entry of the page is referenced or requested. The current page structure may represent the current page of data store entries in the process of being composed where additional new entries may be added to the current page. Thus, for a new data chunk determined not to be a duplicate of an existing chunk of the deduplication data store, an entry may be added to the current page in memory. At some later point in time, such as when the current page is full, the entries of the page may be added (e.g., written out) to the deduplication data store where such entries are stored at logically contiguous locations in the deduplication data store. Additional details regarding the foregoing and other features of techniques herein are described in following paragraphs.

In at least one embodiment in accordance with techniques herein, following paragraphs may provide examples of deduplication processing performed inline as part of the I/O or data path, as described above in connection with ILD processing of FIG. 2B. However, it should be noted that techniques herein are more generally applicable for use in deduplication performed with is not inline or not part of the I/O or data path.

Figure 3:
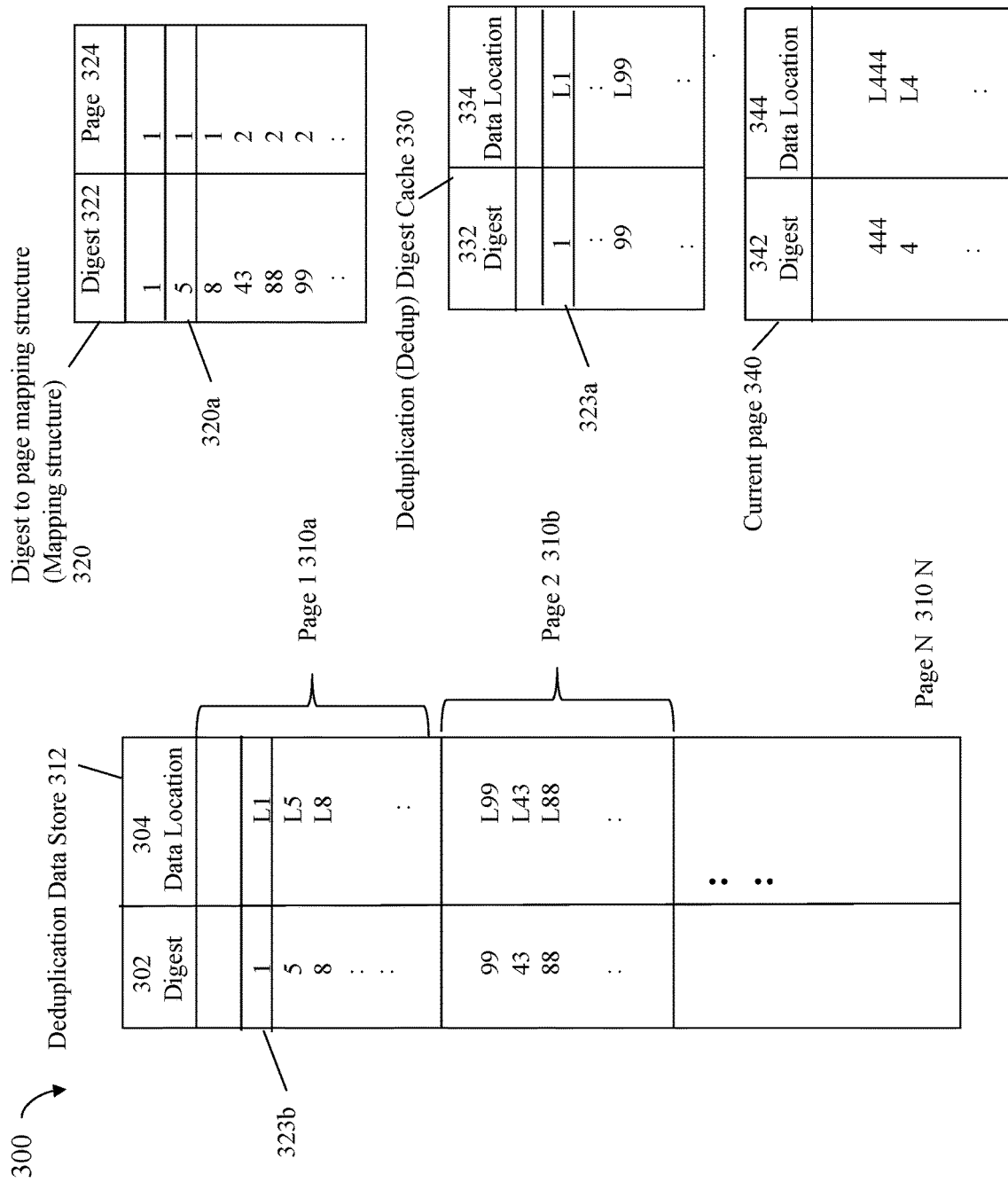
FIG. 3 is an example of structures that may be used in an embodiment in accordance with techniques herein.

Referring to FIG. 3, shown is an example 300 of structures that may be used in an embodiment in accordance with techniques herein. The structures of 300 include the deduplication data store 312, mapping structure 320, deduplication digest cache 330 and current page 340. The deduplication data store 312 may be stored on non-volatile backend physical storage media PDs. The mapping structure 320, deduplication digest cache 330 and current page 340 may be stored in memory, such as memory of a cache. Additionally, the mapping structure 320 and current page 340 may also be persistently stored and maintained on non-volatile storage, such as on PDs of the data storage system.

The data store 312 includes digests 302 and data locations 304. Each entry of the data store 312 may be similar to that as described above in connection with 230 and may identify a digest (302) and associated data location (304). For a single entry or row of 312, the digest 302 is generated from the data or content stored at the location 304. The location 304 may identify a storage address (e.g., LUN and LBA) where the data or content is stored. The data store 312 may include only single unique instances of data chunks (along with other metadata as may be needed for maintaining the table and also in accordance with the particular hash table management used in an embodiment). Thus, the data store 312 may be similar to 230 of FIG. 2A but having a different organization of the entries contained therein into pages described in more detail below.

The deduplication digest cache 330 may include a portion of the entries from the data store 312. In this manner, the structure 330 is a cached copy of at least some of the entries from the data store 312, as stored on relatively slower backend PDs. In at least one embodiment, the structure 330 may have an organization of the entries contained therein similar to that as described above in connection with 230 of FIG. 2A. The structure 330 may be indexed by digests 332 in a manner similar to that as described elsewhere herein in connection with 230 of FIG. 2A.

The mapping structure 320 may include an entry (e.g., mapping entry) for each data chunk stored in the data store 312. Thus, each mapping entry of 320 has a corresponding data store entry in 312. The mapping structure 320 includes digests 322 and pages 324. Each mapping entry of 320 maps a digest 322 for a data chunk to its corresponding page 324 in the data store. For example, entry 320a indicates that the digest 5 (322) has a corresponding data store entry stored in page 1 (324) of the data store, where the page number identified in 324 may then be used to index into the data store 312 to find the page containing the corresponding data store entry.

In at least one embodiment the digests 302 of the data store 312 may be cryptographic hashes where the digest 302 of a particular row is computed based on the data chunk stored at data location 304 of the same particular row. For example, digests 302 may be computed using the SHAH-256 hashing algorithm. Similarly, digests 332 of the deduplication digest cache 3330 may be cryptographic hashes where the digest 332 of a particular row is computed based on the data chunk stored at data location 334 of the same particular row. Additionally, a row of the deduplication data store 312 and its corresponding row of the deduplication digest cache 330 may have matching digests. For example, digest 1 302 of row 323b of 312 matches digest 1 332 of row 323a of 330. In at least one embodiment, the digests 322 of the mapping structure may be truncated digests based on the larger or full digests 322, 302. For example, the truncated digests 322 may be based on a portion or number of the bits of the full digest. When searching for a row of mapping structure 320 having a truncated digest 322 that matches a full digest (e.g., 302, 332), the match may be determined if the truncated digest 322 matches a corresponding portion (e.g., specified bit positions) of the full digest. For example, assume a full digest has N bits with bit positions 0 through N−1, and the truncated digest is formed from bit positions 0 through M (M<N−1) of the full digest. In this case processing looks for a match between the truncated digest and bit positions 0 through M of the full digest.

The data store 312 may be indexed or logically organized and accessed by page number (e.g., rather than indexed by digest as described above with 230). The data store 312 in the example 300 includes N pages. Entries of a page may be stored at logically contiguous locations in the data store 312. Each page may be the same size and may include the same number of entries. In at least one embodiment where the entire data store 312 is implemented as a large array of entries (assuming array starting or base index=1), the beginning offset or location in the array corresponding to a particular page may be determined ((page number−1) (number of entries in single page))+1. For example, assume there are M entries in a single page, page 2 begins at offset M+1, page 3 begins at offset 2M+1, and so on.

In the data store 312, page 1 310a includes a first set of entries determined in accordance with specified criteria to be related and likely to be accessed within the same specified time period or time window. Page 2 310b includes a second set of entries determined in accordance with specified criteria to be related and are likely to be accessed within the same specified time period or time window. For example, the specified criteria used to determine whether entries are related may include temporal locality where data chunks written via I/O operations at the same time, or within some specified time period, may be related to each other in terms of temporal locality. In at least one embodiment, a timestamp (denoting a date and time) may be recorded for each I/O operation where the timestamp may denote the time at which the I/O operation is received at the data storage system. In this manner, the time stamps associated with the data chunks may be used to determine those data chunks having temporal locality (e.g., data chunks have similar time stamps (e.g., time stamps indicating a date/time within the same specified time period or time window). For example, data chunks having entries of page 1 310a may represent blocks of the same first file written to within a specified time period, and data chunks having entries of page 310b may represent blocks of the same second file written to within a specified time period. Temporal locality rationale may be characterized in one aspect that, if a particular set of data chunks are observed as being referenced within a specified time period or time window, when a first of the data chunks is again referenced at a later point in time, it is likely that at least some of the data chunks in the set may also again be referenced within a relatively short amount of time (with respect to the subsequent reference of the first data chunk at the later point in time).

As another example, the specified criteria used to determine whether entries are related may include spatial locality where data chunks which are stored at corresponding physical storage locations in close physical proximity to one another are related and included in the same page. In this manner, spatial locality criteria may be used to retrieve a page/group of entries which are physical stored close to one another on physical storage (e.g., physical backend non-volatile PDs). For example, in connection with data chunks stored on rotating PDs, data chunks in the same group and thus page may be physically located near one another on the same PD to speed access and retrieval from the PD. For example, related entries may have associated data locations 304 which meet specified location criteria, such as be stored on the same PD, same track of the same PD, same cylinder of the same PD, and the like. As another example, the spatial locality criteria may be based on logical proximity or distance of locations of the data chunks of entries in a logical entity, such as data chunks stored at logical locations or offsets in the same file.

In connection with discussion above, provided are examples of criteria that may be used to determine data items that exhibit some degree of locality (e.g., spatial or temporal) relative to each other. The foregoing spatial locality and temporal locality are examples of two types of criteria that may be used to identify related entries of the data store 312 likely to be accessed within the same specified time period or time window. The specified criteria may include, for example, just spatial locality, just temporal locality, or both spatial and temporal locality. As a further example illustrating the combination of spatial and temporal locality, data chunks that are both written in close proximity to one another in terms of time and logical address space may be related. More generally, an embodiment may specify any suitable criteria used to identify a group of related entries of the data store 312.

As such, responsive to a request to access any entry of page, such as page 1 310a, processing herein may fetch the requested entry and additionally, prefetch the remaining entries of the same page 310a. As noted above, it may be beneficial to prefetch the remaining entries of the page and load into cache since one or more of the remaining entries may be expected to also be referenced in proximity in terms of time.

The current page 340 is a single current page currently in the process of being populated or constructed (e.g., meaning the current page is "open"). Once the current open page construction has completed, the current page may be characterized as closed. An embodiment may, more generally, include one or more open current pages in the process of being constructed. For example, there may be 3 open current pages where each of the 3 current pages has different criteria for determining related entries. The current page 340 includes entries for data chunks to be added to the data store 312. Thus, each entry of the current page 340 may include the same information as an entry of the data store 312.

It should be noted that use of a fixed page size is described above in connection with the particular array data structure that may be used implement the data store 312. More generally, any suitable data structure(s) may be used to implement the data store 312. Furthermore, an embodiment may also provide for variable page sizes whereby the number of entries in each page may vary.

In connection generally with structures such as the deduplication data store 312, it should be noted there are 2 important aspects. A first aspect is the index or lookup method that permits locating individual digest entries by a full or partial digest value. This first aspect is necessary in connection with usefulness of the data in the deduplication data store. A second aspect is the layout of the stored data, such as content of the data store 312. The foregoing first aspect of index or lookup method and second aspect of layout of the data within the data store have a degree of independence from each other. An embodiment has a degree of freedom to layout the data in the data store 312 that is most convenient and useful for a purpose other than just being able to locate data based on the digest index. Techniques herein leverage this degree of freedom and provide a layout of the data in the data store 312 in such a way to facilitate efficient prefetching, such as based on spatial or temporal locality of the data. Any particular data item may be located in the data store 312 using the data item's index. Additionally, once the data item is located, the data layout of 312 permits prefetching related data that is likely to be referenced soon.

Figure 4:
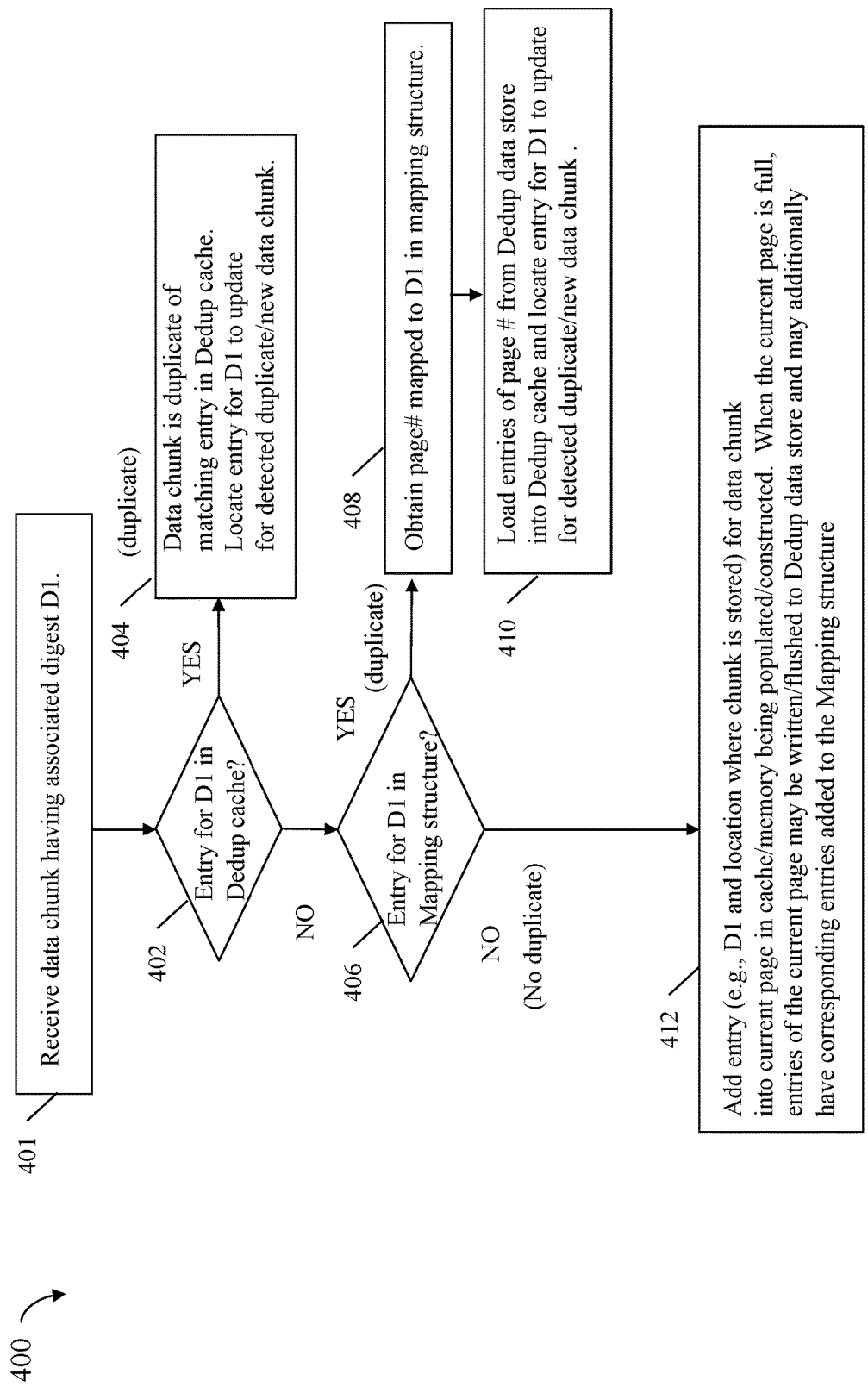
FIG. 4 is a flowchart of processing that may be performed in an embodiment in accordance with techniques herein.

Referring to FIG. 4, shown is a flowchart of processing steps that may be performed in an embodiment in accordance with techniques herein using the structures of FIG. 3. In at least one embodiment performing ILD processing, the processing of flowchart 400 may be triggered responsive to destaging a written data chunk (e.g., WP data) from cache to backend non-volatile storage (e.g., PDs). At step 401, a data chunk is received having an associated digest D1. As noted above, the data chunk received in step 401 may be WP data currently being destaged from cache. From step 401, control proceeds to step 402. At step 402, processing determines whether there is an existing entry for digest D1 in the deduplication digest cache 330. If step 402 evaluates to yes, control proceeds to step 404 where it is determined that the data chunk being destaged is a duplicate of an existing data chunk having the existing entry in the deduplication digest cache 330 and thus a duplicate of a data chunk having an entry stored in the data store 312. Step 404 may include updating metadata (e.g., of the existing entries in 312 and 330) as needed, based on the detected duplicate data chunk.

If step 402 evaluates to no, control proceeds to step 406 where it is determined whether there is an existing mapping entry for digest D1 in the mapping structure. If step 406 evaluates to yes, control proceeds to step 408 where it is determined that the data chunk being destaged is a duplicate of an existing data chunk having the existing mapping entry in the mapping structure 320, and is also a duplicate chunk of an existing entry of the data store 312. In step 408, processing may obtain the page number mapped to D1 in the existing mapping structure entry for D1. From step 408, control proceeds to step 410 where the page number (obtained in step 408) is used as index into the deduplication data store 312 to obtain and load all the entries of the data store 312 of the page number into the deduplication digest cache 330. Step 410 also includes performing processing to identify the particular data store entry of 312 corresponding to the data chunk received in step 401 (that has been detected as a duplicate of the data chunk identified by the particular data store entry). In a manner similar to step 404, it may be necessary in step 410 to update metadata (e.g., such as associated with the particular data store entry of 312) based on the detected duplicate data chunk. If step 406 evaluates to no, control proceeds to step 412 where it is determined that the data chunk received in step 401 is not a duplicate of an existing data chunk having an existing entry already stored in the data store 312. Step 412 may include adding an entry (e.g., having digest D1 and a data location) for the data chunk into the current page in cache being populated or constructed. When the current page is full (e.g., or more generally has been closed whereby the current page construction has completed, entries of the current page may be written or flushed to the deduplication data store 312 and may additionally have corresponding entries added to the mapping structure 320.

Although not illustrated, once processing of flowchart 400 has completed for the particular logical flow of steps executed, control may proceed to other processing associated with data deduplication processing, destaging the data chunk, and the like.

The techniques herein may be performed by any suitable hardware and/or software. For example, techniques herein may be performed by executing code which is stored on any one or more different forms of computer-readable media, where the code may be executed by one or more processors, for example, such as processors of a computer or other system, an ASIC (application specific integrated circuit), and the like. Computer-readable media may include different forms of volatile (e.g., RAM) and non-volatile (e.g., ROM, flash memory, magnetic or optical disks, or tape) storage which may be removable or non-removable.

While the invention has been disclosed in connection with embodiments shown and described in detail, their modifications and improvements thereon will become readily apparent to those skilled in the art. Accordingly, the spirit and scope of the present invention should be limited only by the following claims.

What is claimed is:

1. A method of processing data comprising:
 receiving a data chunk and a digest generated in accordance with the data chunk; and
 performing data deduplication processing for the data chunk comprising:
  determining whether there is an existing entry in a deduplication digest cache for the digest; and
  responsive to determining there is no existing entry in the deduplication digest cache for the digest, performing first processing including:
   determining whether there is an existing entry in a mapping structure for the digest, wherein the mapping structure maps digests to associated pages of related entries in a deduplication data store; and
   responsive to determining there is an existing entry in the mapping structure for the digest, performing second processing including:
    obtaining, from the existing entry of the mapping structure, a first page number mapped to the digest, wherein the first page number identifies a first page of a plurality of related entries of the deduplication data store and wherein the first page of the plurality of related entries of the deduplication data store includes a first entry for the data chunk and the digest of the data chunk; and
    responsive to obtaining the first page number from the existing entry of the mapping structure, loading the plurality of related entries of the first page from the deduplication data store into the deduplication digest cache, wherein each entry of the plurality related entries of the first page of the deduplication data store includes a different one of a plurality of digests.

2. The method of claim 1, wherein if there is an existing entry in the mapping structure for the digest, determining that the data chunk is a duplicate of an existing data chunk stored in the deduplication data store.

3. The method of claim 1, wherein if there is an existing entry in the deduplication digest cache for the digest, determining that the data chunk is a duplicate of an existing data chunk stored in the deduplication data store.

4. The method of claim 1, further comprising:
responsive to determining there is no existing entry in the mapping structure for the digest, performing third processing including:
adding a new entry for the data chunk to a current page that is included in a cache and that is currently being populated.

5. The method of claim 4, further comprising:
determining whether the current page is complete whereby no additional entries are to be added to the current page; and
responsive to determining the current page is complete, performing fourth processing including:
updating the deduplication data store and the mapping structure in accordance with a plurality of entries of the current page.

6. The method of claim 5, wherein the fourth processing includes:
adding new entries to the deduplication data store and the mapping structure corresponding to the plurality of entries in the current page, wherein the new entries added to the deduplication data store are logically contiguous in the deduplication data store.

7. The method of claim 5, wherein the current page is determined as complete when the current page is full and includes a specified number of entries.

8. The method of claim 1, wherein the mapping structure and deduplication digest cache are stored in a memory, and the deduplication data store is stored on non-volatile storage ranked as having a lower performance relative to the memory.

9. The method of claim 1, wherein the deduplication digest cache includes entries identifying a portion of corresponding entries in the deduplication data store.

10. The method of claim 9, wherein each entry of the deduplication digest cache and its corresponding entry in the deduplication data store both identify a same digest and a location where a particular data chunk, having the same digest, is stored.

11. The method of claim 1, wherein the deduplication data store comprises a plurality of pages, each of the plurality of pages including a plurality of entries determined as related in accordance with one or more specified criteria.

12. The method of claim 11, wherein the one or more specified criteria include temporal locality wherein entries of a same page of the deduplication data store are all written in connection with write I/O operations received within a same time period.

13. The method of claim 11, wherein the one or more specified criteria include spatial locality wherein entries of a same page of the deduplication data store identify data chunks that are stored in proximity to one another on physical storage.

14. The method of claim 11, wherein the one or more specified criteria include spatial locality wherein entries of a same page of the deduplication data store identify data chunks that are stored in logical proximity to one another in a logical address space.

15. A system comprising:
one or more processors; and
a memory comprising code stored thereon that, when executed, performs a method of processing data comprising:
receiving a first data chunk and a first digest generated in accordance with the first data chunk; and
performing data deduplication processing for the first data chunk comprising:
determining whether there is an existing entry in a deduplication digest cache for the first digest; and
responsive to determining there is no existing entry in the deduplication digest cache for the first digest, performing first processing including:
determining whether there is an existing entry in a mapping structure for the first digest, wherein the mapping structure maps digests to associated pages of related entries in a deduplication data store; and
responsive to determining there is an existing entry in the mapping structure for the first digest, performing second processing including:
obtaining, from the existing entry of the mapping structure, a first page number mapped to the digest, wherein the first page number identifies a first page of a plurality of related entries of the deduplication data store and wherein the first page of the plurality of related entries of the deduplication data store includes a first entry for the data chunk and the digest of the data chunk; and
responsive to obtaining the first page number from the existing entry of the mapping structure, loading the plurality of related entries of the first page from the deduplication data store into the deduplication digest cache, wherein each entry of the plurality related entries of the first page of the deduplication data store includes a different one of a plurality of digests.

16. A computer readable medium comprising code stored thereon that, when executed, performs a method of processing data comprising:
receiving a first data chunk and a first digest generated in accordance with the first data chunk; and
performing data deduplication processing for the first data chunk comprising:
determining whether there is an existing entry in a deduplication digest cache for the first digest; and
responsive to determining there is no existing entry in the deduplication digest cache for the first digest, performing first processing including:
determining whether there is an existing entry in a mapping structure for the first digest, wherein the mapping structure maps digests to associated pages of related entries in a deduplication data store; and
responsive to determining there is an existing entry in the mapping structure for the first digest, performing second processing including:
obtaining, from the existing entry of the mapping structure, a first page number mapped to the digest, wherein the first page number identifies a first page of a plurality of related entries of the deduplication data store and wherein the first page of the plurality of related entries of the deduplication data store includes a first entry for the data chunk and the digest of the data chunk; and
responsive to obtaining the first page number from the existing entry of the mapping structure, loading the plurality of related entries of the first page from the deduplication data store into the deduplication digest cache, wherein each entry of the plurality related entries of the first page of the deduplication data store includes a different one of a plurality of digests.

17. The computer readable medium of claim 16, wherein if there is an existing entry in the mapping structure for the digest, determining that the data chunk is a duplicate of an existing data chunk stored in the deduplication data store.

18. The computer readable medium of claim 16, wherein if there is an existing entry in the deduplication digest cache for the digest, determining that the data chunk is a duplicate of an existing data chunk stored in the deduplication data store.

19. The computer readable medium of claim 16, wherein the method further comprises:
    responsive to determining there is no existing entry in the mapping structure for the digest, performing third processing including:
        adding a new entry for the data chunk to a current page that is included in a cache and that is currently being populated.

20. The computer readable medium of claim 19, wherein the method further comprises:
    determining whether the current page is complete whereby no additional entries are to be added to the current page; and
    responsive to determining the current page is complete, performing fourth processing including:
        updating the deduplication data store and the mapping structure in accordance with a plurality of entries of the current page; and
        adding new entries to the deduplication data store and the mapping structure corresponding to the plurality of entries in the current page, wherein the new entries added to the deduplication data store are logically contiguous in the deduplication data store.

\* \* \* \* \*